United States Patent
Anderson et al.

(10) Patent No.: US 10,604,911 B2
(45) Date of Patent: Mar. 31, 2020

(54) UNDERWATER PIPELINE BURYING APPARATUS AND METHOD

(71) Applicant: BISSO MARINE, LLC, The Woodlands, TX (US)

(72) Inventors: Richard Allen Anderson, Lafayette, LA (US); William A. Bisso, IV, Tomball, TX (US)

(73) Assignee: BISSO MARINE, LLC, New Orleans, LA (US)

(*) Notice: Subject to any disclaimer, the term of this patent is extended or adjusted under 35 U.S.C. 154(b) by 0 days.

(21) Appl. No.: 16/208,972

(22) Filed: Dec. 4, 2018

(65) Prior Publication Data

US 2019/0177950 A1 Jun. 13, 2019

Related U.S. Application Data

(63) Continuation of application No. 15/494,165, filed on Apr. 21, 2017, now Pat. No. 10,151,079.
(Continued)

(51) Int. Cl.
*E02F 5/10* (2006.01)
*E02F 3/92* (2006.01)
(Continued)

(52) U.S. Cl.
CPC ............ *E02F 5/107* (2013.01); *E02F 3/9206* (2013.01); *E02F 5/104* (2013.01); *E02F 5/105* (2013.01); *E02F 9/06* (2013.01); *F16L 1/16* (2013.01)

(58) Field of Classification Search
CPC . E02F 5/107; E02F 5/105; E02F 5/104; E02F 3/9206; E02F 5/108; B05B 7/10;
(Continued)

(56) References Cited

U.S. PATENT DOCUMENTS 3,338,059 A    8/1967 Tittle
3,877,237 A *  4/1975 Norman .................. E02F 5/105
                                              405/160
(Continued)

OTHER PUBLICATIONS

Notification of Transmittal of the International Search Report and the Written Opinion of the International Searching Authority for International App. No. PCT/US2017/028929, dated Aug. 22, 2017.

*Primary Examiner* — Carib A Oquendo
(74) *Attorney, Agent, or Firm* — Garvey, Smith & Nehrbass, Patent Attorneys, L.L.C.; Charles C. Garvey, Jr.; Vanessa M. D'Souza

(57) ABSTRACT

The present invention provides an improved pipeline burying apparatus that uses specially configured jetting nozzles that intake sea water surrounding the nozzle. The apparatus provides a frame supporting spaced apart left and right inclined pipe sections that are configured to be placed on opposing sides of the pipeline to be buried. Each inclined pipe section is fitted with a plurality of jetting nozzles that are positioned on one of the inclined pipe sections, in vertically spaced apart positions and in horizontally spaced apart positions. At least some of said jetting nozzles include a nozzle body having an outer surface and a main, central longitudinal fluid flow channel with a central channel axis. A fluid inlet end portion of the nozzle body has an externally threaded portion that enables connection to an internally threaded portion of a selected one of the inclined pipe sections. A discharge end portion of the nozzle body extends outwardly from an inclined pipe and the threaded portion. A plurality of lateral channels each intersect the main channel at an acute angle. In one embodiment, the main central longitudinal channel has an inlet section with an inlet section diameter, a discharge section having an outlet section diameter and a connecting section that is in between the inlet section and the outlet section.

42 Claims, 15 Drawing Sheets

Related U.S. Application Data

(60) Provisional application No. 62/325,740, filed on Apr. 21, 2016.

(51) Int. Cl.
*E02F 9/06* (2006.01)
*F16L 1/16* (2006.01)

(58) Field of Classification Search
CPC ............. B05B 7/0408; B05B 7/0433; B01F 2005/004; B01F 5/0057; F04F 5/42
See application file for complete search history.

(56) References Cited

U.S. PATENT DOCUMENTS

| | | | |
|---|---|---|---|
| 3,982,403 A | 9/1976 | Waterhouse | |
| 4,044,566 A | 8/1977 | Biberg | |
| 4,091,629 A | 5/1978 | Gunn et al. | |
| 4,112,695 A * | 9/1978 | Chang | E02F 3/8875 37/323 |
| 4,114,390 A * | 9/1978 | Van Steveninck | E02F 3/9206 37/321 |
| 4,165,571 A | 8/1979 | Chang et al. | |
| 4,274,760 A | 6/1981 | Norman | |
| 4,280,289 A * | 7/1981 | Bassompierre-Sewrin | E02F 3/9206 104/118 |
| 4,389,139 A | 6/1983 | Norman | |
| 4,479,741 A | 10/1984 | Berti et al. | |
| 4,516,880 A * | 5/1985 | Martin | E02F 5/107 405/160 |
| 4,537,530 A | 8/1985 | Yamamura et al. | |
| 4,586,850 A | 5/1986 | Norman et al. | |
| 4,714,378 A * | 12/1987 | Lincoln | E02F 5/104 37/322 |
| 4,721,409 A | 1/1988 | Harmstorf | |
| 4,787,777 A | 11/1988 | Harmstorf | |
| 4,986,697 A | 1/1991 | Lynch | |
| 5,322,222 A * | 6/1994 | Lott | B05B 7/0408 239/396 |
| 5,626,438 A | 5/1997 | Etheridge | |
| 5,659,983 A | 8/1997 | Coutarel et al. | |
| 5,944,447 A | 8/1999 | Wyatt | |
| 6,022,173 A | 2/2000 | Saxon | |
| 6,154,988 A | 12/2000 | Bykov et al. | |
| 6,273,642 B1 * | 8/2001 | Anderson | E02F 5/105 405/163 |
| 6,449,883 B1 | 9/2002 | Vandycke | |
| 6,681,711 B2 | 1/2004 | King | |
| 6,705,029 B2 | 3/2004 | Anderson | |
| 6,719,494 B1 | 4/2004 | Machin | |
| 6,821,054 B2 | 11/2004 | Ballard | |
| 7,637,696 B2 | 12/2009 | Antill, Sr. | |
| 8,066,450 B2 | 11/2011 | Cocca | |
| 8,834,068 B2 | 9/2014 | Lazzarin et al. | |
| 9,140,382 B2 | 9/2015 | Fassetta et al. | |
| 10,151,079 B2 | 12/2018 | Anderson et al. | |
| 2003/0177670 A1 * | 9/2003 | Anderson | E02F 5/105 37/307 |
| 2009/0274520 A1 * | 11/2009 | Antill, Sr. | E02F 3/9206 405/163 |
| 2010/0129158 A1 | 5/2010 | Antill, Sr. | |

\* cited by examiner

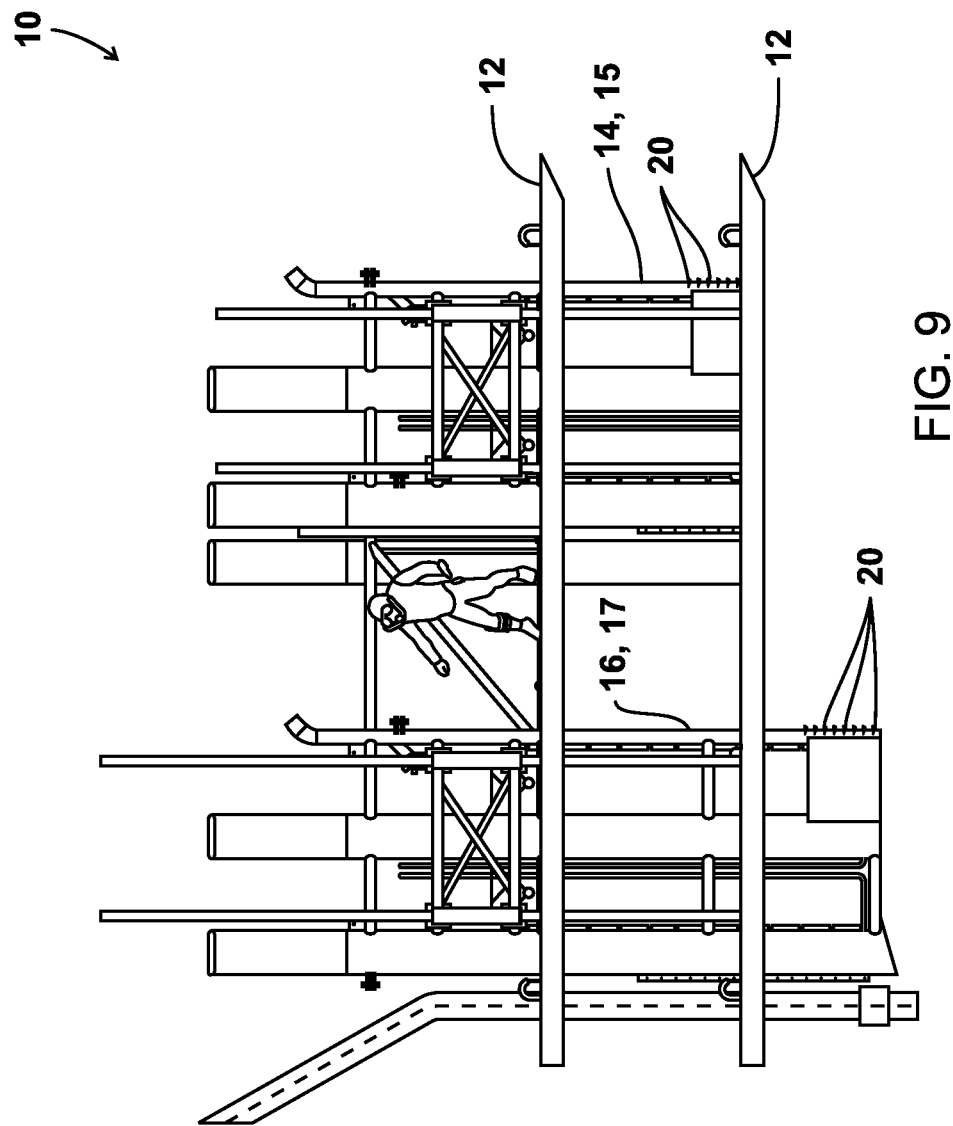

UNDERWATER PIPELINE BURYING APPARATUS AND METHOD

CROSS-REFERENCE TO RELATED APPLICATIONS

This is a continuation of U.S. patent application Ser. No. 15/494,165, filed 21 Apr. 2017 (now U.S. Pat. No. 10,151,079, issued on 11 Dec. 2018), which claims benefit of U.S. Provisional Patent Application Ser. No. 62/325,740, filed 21 Apr. 2016, priority to and/or the benefit of each of which is hereby claimed.

Priority to and/or the benefit of U.S. Provisional Patent Application Ser. No. 62/325,740, filed 21 Apr. 2016, which is hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to underwater pipeline burying and more particularly to an improved underwater pipeline burying apparatus and method wherein jetting nozzles on a sled or frame mix a high velocity jetting stream with surrounding sea water that surrounds the outer surface of a nozzle body. The high velocity fluid stream flows in a central channel. Mixing uses one or more diagonally extending lateral channels that each connect the central channel to the nozzle body outer surface which is in communication with the surrounding sea water.

2. General Background of the Invention

Pipeline burying sleds typically use a frame that can be self-propelled or towed. The sled travels along the pipeline, usually straddling the pipeline. One or more (e.g., usually two or more) inclined pipes are each fitted with multiple jetting nozzles that can cut the seabed as the sled moves (or is moved). The nozzles preferably only cut the seabed. The sediment that has been cut must then be fluidized and slurried so that it can be removed from the trench or ditch area. Patents have issued that are directed to pipeline burying apparatus/methods. The following table lists examples, each of which is hereby incorporated herein by reference:

TABLE

| Patent No. | Title | Issue Date |
|---|---|---|
| 9,140,382 | Gripper for Continuous Elongated Members, Vehicles Movable Along a Continuous Elongated Member, and Method of Advancing the Vehicle | Sep. 22, 2015 |
| 8,834,068 | Group and Method for Laying and Burying Pipelines at the Seafloor | Sep. 16, 2014 |
| 8,066,450 | Device and Method for the Towing of Underwater Pipelines | Nov. 29, 2011 |
| 7,637,696 | Underwater Trenching Apparatus | Dec. 29, 2009 |
| 6,821,054 | Method and System for Laying Pipe | Nov. 23, 2004 |

TABLE-continued

| Patent No. | Title | Issue Date |
|---|---|---|
| 6,719,494 | Cable and Pope Burial Apparatus and Method Through the Use of a Plow | Apr. 13, 2004 |
| 6,705,029 | Trenching Machine | Mar. 16, 2004 |
| 6,681,711 | System for Developing Cable | Jan. 27, 2004 |
| 6,449,883 | Method and Device for Dredging Underwater Ground Layers | Sep. 17, 2002 |
| 6,273,642 | Buoyant Propulsion Underwater Trenching Apparatus | Aug. 14, 2001 |
| 6,154,988 | Machine for Digging Under Pipes and Caterpillar Traction Device | Dec. 5, 2000 |
| 6,022,173 | Underwater Trenching System | Feb. 8, 2000 |
| 5,944,447 | Underwater Pipeline Entrenching Apparatus and Method of Using the1 Same | Aug. 31, 1999 |
| 5,659,983 | Device for Filling in a Trench Dug in the Sea Bed in Order to Cover a Pipe Laid Down in the Trench | Aug. 26, 1997 |
| 5,626,438 | System for Excavating and Rehabilitating Underwater Pipelines | May 6, 1997 |
| 4,986,697 | Marine Pipeline Trenching Plow for Simultaneous Pipe Laying and Entrenchment | Jan. 22, 1991 |
| 4,787,777 | Method and Device for Progressively Producing an Underwater Laying-Out Channel | Nov. 29, 1988 |
| 4,721,409 | Method and Device for Progressively Producing an Underwater Laying-Out Channel | Jan. 26, 1088 |
| 4,714,378 | Apparatus and Method for Trenching Subsea Pipelines | Dec. 22, 1987 |
| 4,586,850 | Underwater Trenching System | May 6, 1986 |
| 4,537,530 | Marine Cable Burying Method and Device Therefor | Aug. 27, 1985 |
| 4,516,880 | Underwater Trenching Apparatus | May 14, 1985 |
| 4,479,741 | Device for Laying Underground or Digging up Subsea Conduits | Oct. 30, 1984 |
| 4,389,139 | Oscillating Jet Head Underwater Trenching Apparatus | Jun. 21, 1983 |
| 4,280,289 | Underwater Trenching Machine for Burying Pipeline and the Like | Jul. 28, 1981 |
| 4,274,760 | Self-Propelled Underwater Trenching Apparatus and Method | Jun. 23, 1981 |
| 4,165,571 | Sea Sled with Jet Pump for Underwater Trenching and Slurry Removal | Aug. 28, 1979 |
| 4,114,390 | Burying a Conduit in the Bottom of a Body of Water | Sep. 19, 1978 |
| 4,112,695 | Sea Sled for Entrenching Pipe | Sep. 12, 1978 |
| 4,091,629 | Marine Pipeline Installation System | May 30, 1978 |
| 4,044,566 | Machine for Forming Trenches for Pipelines or the Like in the Sea Bed | Aug. 30, 1977 |
| 3,982,403 | Laying Cables and the Like Under Water | Sep. 28, 1976 |
| 3,877,237 | Underwater Trenching Apparatus Guidance System | Aug. 15, 1975 |
| 3,338,059 | Methods and Apparatus for Entrenching Submerged Elongate Structures | Aug. 29, 1967 |

BRIEF SUMMARY OF THE INVENTION

A preferred embodiment of the apparatus of the present invention provides an improved pipeline burying apparatus using a specially configured jetting nozzle arrangement that includes an intake of sea water surrounding the nozzle.

The apparatus provides a frame that can support spaced apart left and right inclined pipe sections that can be configured to be placed on opposing sides of the pipeline to be buried.

Each inclined pipe section is preferably fitted with a plurality of jetting nozzles that can be positioned on the inclined pipe sections, in vertically spaced apart positions and in horizontally spaced apart positions.

At least some of said jetting nozzles preferably include a nozzle body having an outer surface and a main, central longitudinal fluid flow channel with a central channel axis.

A fluid inlet end portion of the nozzle body has an externally threaded portion that enables connection to an internally threaded portion of a selected one of the inclined pipe sections.

A discharge end portion of the nozzle body extends outwardly from an inclined pipe and a threaded portion.

A plurality of lateral channels each intersect the main channel at an acute angle.

In one embodiment, the main central longitudinal channel has an inlet section with an inlet section diameter, a discharge section having an outlet section diameter and a connecting section that is in between the inlet section and the outlet section.

In one embodiment, the connecting section is generally cylindrically shaped.

In one embodiment, the connecting section has a diameter that is smaller than the diameter of the discharge section.

In one embodiment, at least one lateral channel intersects with the discharge section.

In one embodiment, multiple lateral channels intersect with the discharge section.

In one embodiment, each lateral channel has a lateral channel inlet and a lateral channel outlet that is in fluid communication with the discharge section, and wherein the lateral channel outlet is closer than the lateral channel inlet to the discharge end portion.

In one embodiment, there are at least three of the lateral channels.

In one embodiment, there are at least four of said lateral channels.

In one embodiment, at least a part of said central longitudinal axis is conically shaped.

In one embodiment, at least a part of said longitudinal axis is frustoconically shaped.

In one embodiment, the angle is between about ten and eighty degrees.

In one embodiment, the angle is between about twenty and seventy degrees.

In one embodiment, the angle is between about thirty and sixty degrees.

In one embodiment, the angle is between about forty and fifty degrees.

In one embodiment, the angle is about forty-five degrees.

The present invention also provides an improved method of burying an underwater pipeline.

The method includes providing a frame that is adapted to travel along the pipeline to be buried, the frame having one or more vertical members fitted with multiple jetting nozzles, each jetting nozzle having a central fluid flow channel having an inlet that communicates with the interior of an inclined pipe and an outlet that discharges pressurized fluid externally of an inclined pipe.

Water and air are pumped under pressure to the central channel of the jetting nozzles via the vertical members.

Sea water surrounding at least part of the outer surface of the nozzle is water that is at a hydrostatic pressure based upon the water depth at the nozzle. Sea water mixes with water in the central channel by intaking the sea water via one or more lateral flow lines that each communicate with the nozzle outer surface and the nozzle central channel.

In one embodiment, the pressure of air and water flowing in the central channel is between about three hundred and three thousand p.s.i. (between about 2,068 and 20,684 kilopascal).

In one embodiment, the central channel has an inlet section with an inlet section diameter, a discharge section with a discharge section diameter and a connecting channel section in between the inlet section and discharge section.

In one embodiment, the connecting channel has a diameter that is smaller than the discharge section diameter.

In one embodiment, air flows into one or more air lifts that lift cuttings away from the trench or ditch.

In one or more embodiments, an underwater pipeline burying apparatus, comprises:

(a) a frame;

(b) spaced apart left and right inclined pipe sections of the frame that are configured to be placed on opposing sides of the pipeline to be buried;

(c) each said inclined pipe section fitted with a plurality of jetting nozzles that are positioned on a said pipe section in substantially vertically spaced apart positions and in substantially horizontally spaced apart positions; and (d) at least some of said plurality of jetting nozzles including:
  a nozzle body having an outer surface and a main, central longitudinal channel with a central channel axis;
  a fluid inlet end portion of said body having an externally threaded portion;
  a discharge end portion of said body extending outwardly from a said inclined pipe section and said threaded portion; and
  a plurality of lateral channels that intersect said main channel at an acute angle.

In one or more embodiments, said main central longitudinal channel having an inlet section with an inlet section diameter, a discharge section having an outlet section diameter and a connecting section that is in between the inlet section and the discharge section.

In one or more embodiments, the connecting section is generally cylindrically shaped.

In one or more embodiments, the connecting section has a diameter that is smaller than the diameter of the discharge section.

In one or more embodiments, at least one said lateral channel intersects with said discharge section.

In one or more embodiments, multiple said lateral channels intersect with said discharge section.

In one or more embodiments, each lateral channel has a lateral channel inlet and a lateral channel outlet that is in fluid communication with said discharge section, and wherein the lateral channel outlet is closer than the lateral channel inlet to the discharge end portion.

In one or more embodiments, there are at least three of said lateral channels.

In one or more embodiments, there are at least four of said lateral channels.

In one or more embodiments, at least a part of said central longitudinal axis is conically shaped.

In one or more embodiments, at least a part of said central longitudinal axis is frustoconically shaped.

In one or more embodiments, said angle is between about ten and eighty degrees.

In one or more embodiments, said angle is between about twenty and seventy degrees.

In one or more embodiments, said angle is between about thirty and sixty degrees.

In one or more embodiments, said angle is between about forty and fifty degrees.

In one or more embodiments, said angle is about forty-five degrees.

In one or more embodiments, the fluid inlet includes a supply of pressurized air.

In one or more embodiments, the pressurized air has a flow rate of between about 400 cubic feet per minute (c.p.m) and 10,000 cubic feet per minute (c.p.m.) (between about 11 to 283 cubic meters per minute).

In one or more embodiments, the pressurized air has a pressure of between about 100 and 300 p.s.i. (between about 689 and 2,068 kilopascals (kpa)).

In one or more embodiments, the fluid inlet connects to a source of fluid of between 400 cubic feet per minute (c.f.m.) (11 cubic meters per minute) at 100 p.s.i. (689 kpa) and 10,000 c.f.m. (283 cubic meters per minute) at 300 p.s.i. (2,068 kpa).

In one or more embodiments, a method of burying an underwater pipeline, comprises the steps of:

(a) providing a frame that is adapted to travel along the pipeline to be buried, the frame having one or more vertical members fitted with multiple jetting nozzles, each jetting nozzle having an outer surface and a central flow channel having an inlet that communicates with an interior of an inclined pipe and an outlet that discharges pressurized fluid externally of an inclined pipe to cut soil or sediment at a seabed;

(b) pumping fluid under pressure to the central flow channel of the jetting nozzles via the vertical members; and (c) mixing sea water that is at a hydrostatic pressure based upon water depth at the jetting nozzles with the fluid under pressure of step "b" by intaking the sea water via one or more lateral flow lines that each communicate with the nozzle outer surface and the nozzle central flow channel.

In one or more embodiments, the pressure in step "b" is between about three hundred and three thousand p.s.i (between about 2,068 and 20,684 kilopascal).

In one or more embodiments, the central channel has an inlet section with an inlet section diameter, a discharge section with a discharge section diameter and a connecting channel section in between the inlet section and discharge section.

In one or more embodiments, the connecting channel has a diameter that is smaller than the discharge section diameter.

In one or more embodiments, the apparatus is powered by 100 to 20,000 total horsepower (74.56 to 14,914 total kilowatts).

In one or more embodiments, in step "b" the fluid includes air.

In one or more embodiments, the air flows at between 400 and 10,000 cubic feet per minute (c.f.m.) (between about 11 to 283 cubic meters per minute).

In one or more embodiments, the frame weighs between 5 and 250 tons (between 4.5 to 227 metric tons).

In one or more embodiments, the frame operates at a seabed soil pressure of between about 200 pounds per square foot (976 kilograms per square meter) and 6,265 pounds per square foot (30,588 kilograms per square meter).

In one or more embodiments, the soil or sediment density is between about 68 pounds per cubic foot (1089 kilograms per cubic meter) and 187 pounds per cubic foot (2,995 kilograms per cubic meter).

In one or more embodiments, the pipeline is between about 2 inches (5.08 centimeters) and 84 inches (213 centimeters) in diameter.

In one or more embodiments, the pipeline is rigid steel, flexible steel, an umbilical, HDPE (high density polyethylene), or a cable.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 9 is a side elevation view of a preferred embodiment of the apparatus of the present invention;

DETAILED DESCRIPTION OF THE INVENTION

Figure 1:
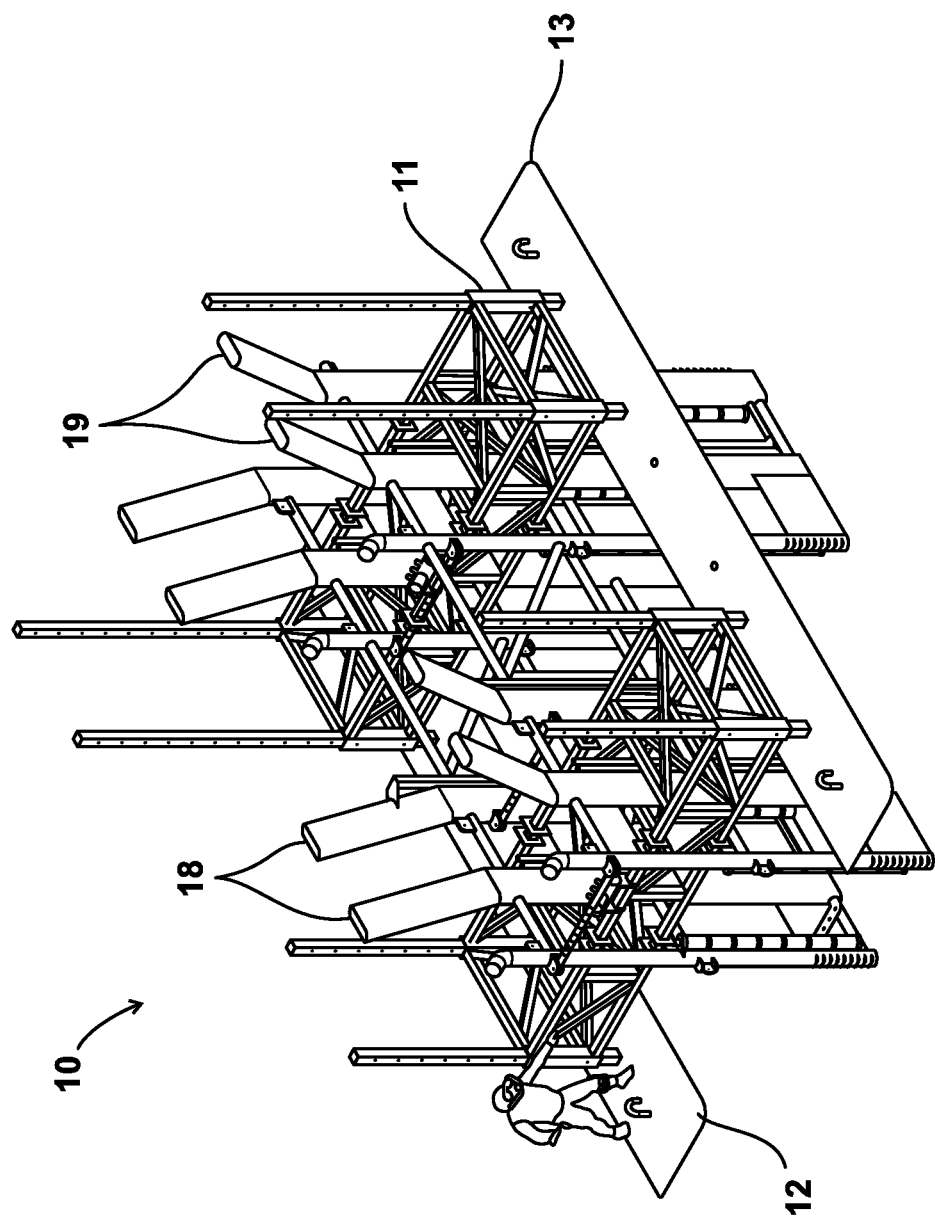
FIG. 1 is a perspective view of a preferred embodiment of the apparatus of the present invention.

FIGS. 1-20 show a preferred embodiment of the apparatus of the present invention, designated generally by the numeral 10. Pipe burying apparatus 10 and the method of the present invention provides a frame or sled 11 (e.g., of welded steel construction). In one embodiment of the present invention, pipe burying apparatus 10 is preferably about 25-50 feet (7.62 to 15.24 meters) in length, more preferably about 30-40 feet (9.14 and 12.19 meters) in length, and most preferably, about 31 feet (9.45 meters), 6 inches (15.24 centimeters) in length. In one embodiment of the present invention, pipe burying apparatus 10 is preferably about 10-60 feet (3.05 to 18.29 meters) wide, more preferably about 15-45 feet (4.6 to 13.7 meters) wide, and most preferably about 20-30 feet (6.1 to 9.14 meters) wide.

In one embodiment of the present invention, pipe burying apparatus 10 is preferably about 15-45 feet (4.6 to 13.7 meters) in height, more preferably about 20-40 feet (6.1 to 12.19 meters) in height, and most preferably about 26 feet, 15 5/16 inches (7.9 meters and 38.89 centimeters) in height. In one embodiment of the present invention, frame or sled 11 is preferably about 20-50 feet (6.1 to 15.24 meters) long, more preferably about 30-40 feet (9.14 and 12.19 meters) long, and most preferably about 35 feet (10.67 meters) long. In one embodiment of the present invention, frame or sled 11 is preferably about 10-55 feet (3.05 to 16.76 meters) wide, more preferably about 12-40 feet (3.6 to 12.19 meters) wide, and most preferably about 16-26 feet (4.87 to 7.9 meters) wide. In one embodiment of the present invention, frame or sled 11 is preferably about 10-30 feet (3.05 to 9.14 meters) in height, more preferably about 12-25 feet (3.7 to 7.6 meters) in height, and most preferably about 15 feet (4.6 meters), 10 5/16 inches (26.12 centimeters) in height.

Figure 12:
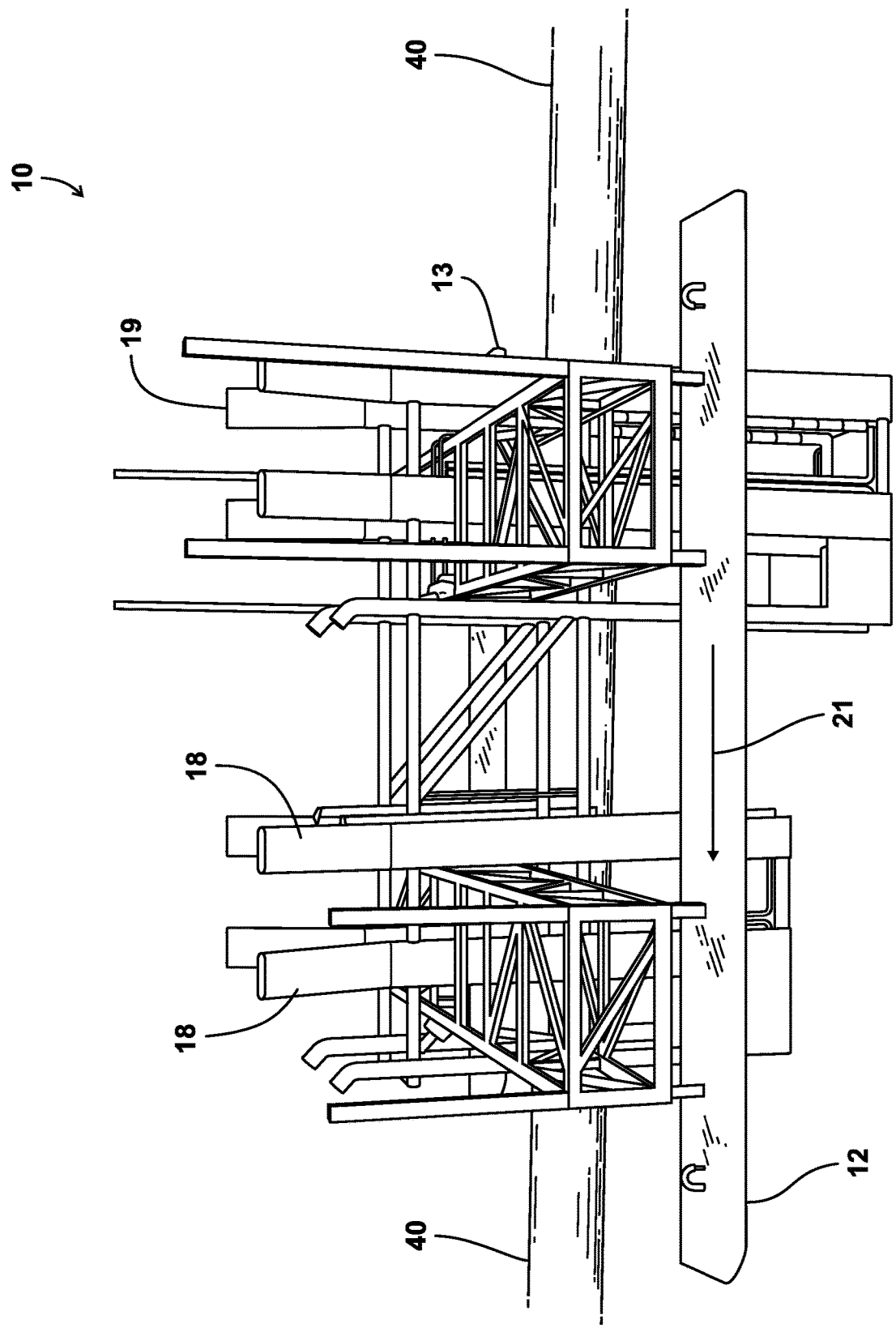
FIG. 12 is a perspective view of a preferred embodiment of the apparatus of the present invention.
Figure 13:
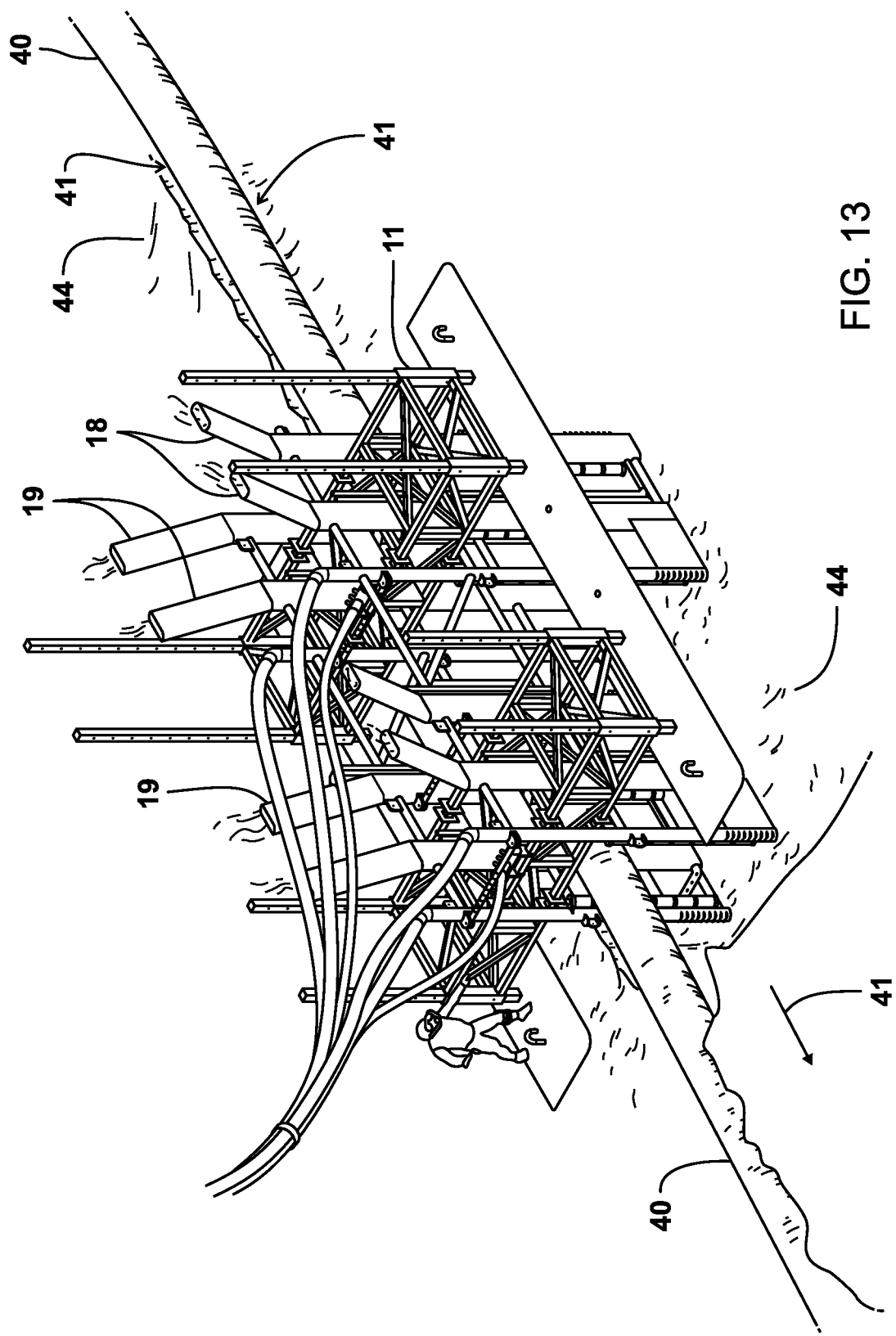
FIG. 13 is a perspective view of a preferred embodiment of the apparatus of the present invention.

Frame 11 has a pair of spaced apart pontoons or skids 12, 13 that track the seabed 44 as the frame 11 is moved or moves along the seabed 44 while burying a pipeline 40 (as seen as in FIG. 12 and indicated by direction of travel arrow 21). In one embodiment of the present invention, skids 12, 13 are preferably made out of steel, stainless steel or aluminum. In one embodiment of the present invention, each skid 12, 13 is preferably about 1-24 inches (2.54 to 60.96 centimeters) in height, more preferably, about 2-18 inches (5.08 to 45.72 centimeters) in height, and most preferably, about 8 5/8 inches (21.9 centimeters) in height. In one embodiment of the present invention, each skid 12, 13 is preferably about 2-10 feet (0.61 to 3.05 meters) wide, more preferably, about 3-8 feet (0.91 to 2.43 meters) wide, and most preferably, about 4 feet (1.22 meters) wide.

In one embodiment of the present invention, each skid 12, 13 is preferably about 25-60 feet (7.62 to 18.29 meters) long, more preferably about 30-45 feet (9.1 to 13.71 meters) long, and most preferably about 31 feet (9.45 meters), 6 inches (15.24 centimeters) long. The frame 11 can be made to straddle the pipeline 40, with one pontoon or skid 12 being a port side pontoon or skid, the other pontoon or skid 13 being a starboard pontoon or skid (see FIG. 13).

In order to excavate a trench or ditch 41 and thus bury the pipeline 40, multiple jetting nozzles 20 are provided. These nozzles 20 are mounted to inclined or vertical pipe sections 14-17 on frame 11. The vertical pipe sections 14-17 preferably define the width of the trench or ditch 41. The position of each inclined or vertical pipe 14-17 can be adjusted relative to the frame 11. In one embodiment of the present invention, the nozzles 20 can be made out of stainless steel with inserts (e.g., metal that is harder than steel).

Pipe sections or pipes 14, 15, 16 and 17 on frame 11 can be inclined or generally vertically oriented. In one embodiment of the present invention, pipe sections 14, 15, 16, and 17 can be made out of steel, stainless steel or aluminum. There can be forward pipe sections 14, 15 at the front of frame 11 and rear pipe sections 16, 17 at the rear of frame 11.

Figure 2:
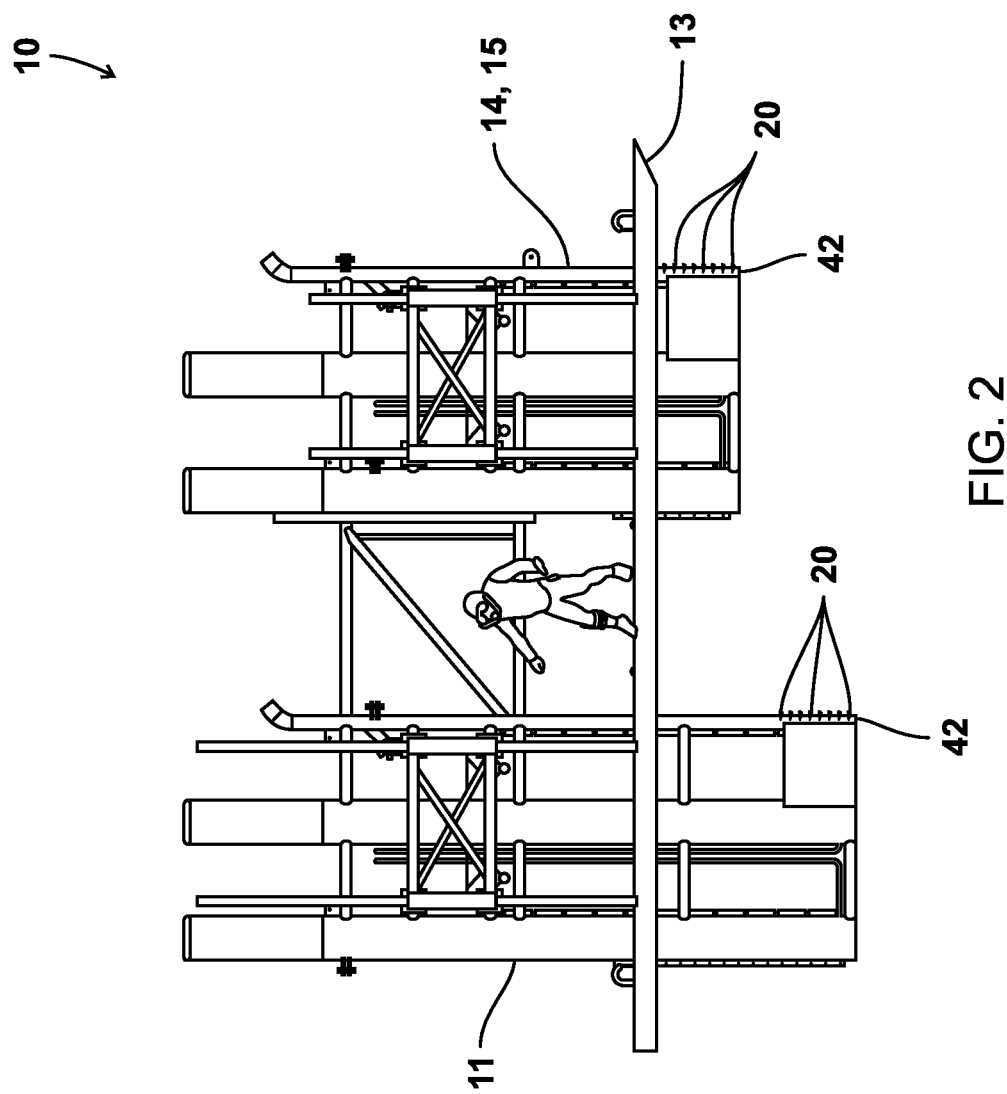
FIG. 2 is a side elevation view of a preferred embodiment of the apparatus of the present invention.
Figure 3:
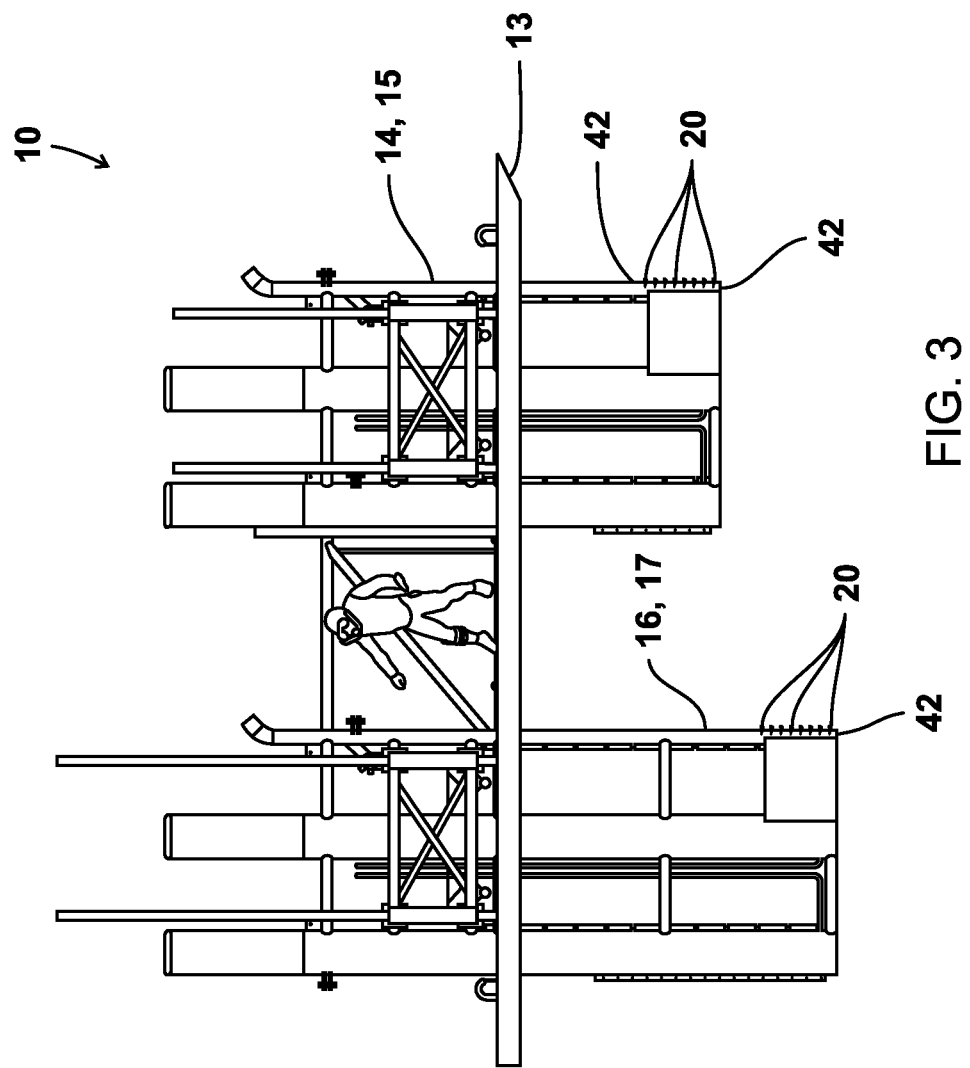
FIG. 3 is a side elevation of a preferred embodiment of the apparatus of the present invention.
Figure 4:
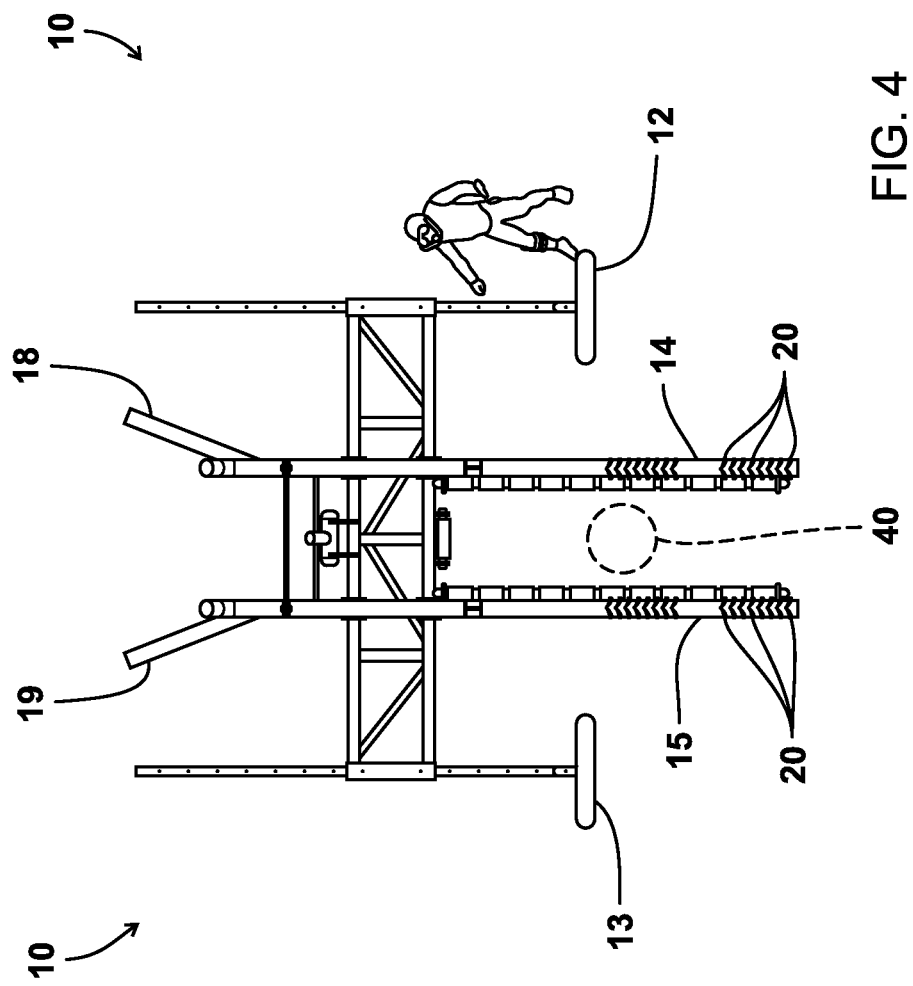
FIG. 4 is a front elevation view of a preferred embodiment of the apparatus of the present invention.
Figure 5:
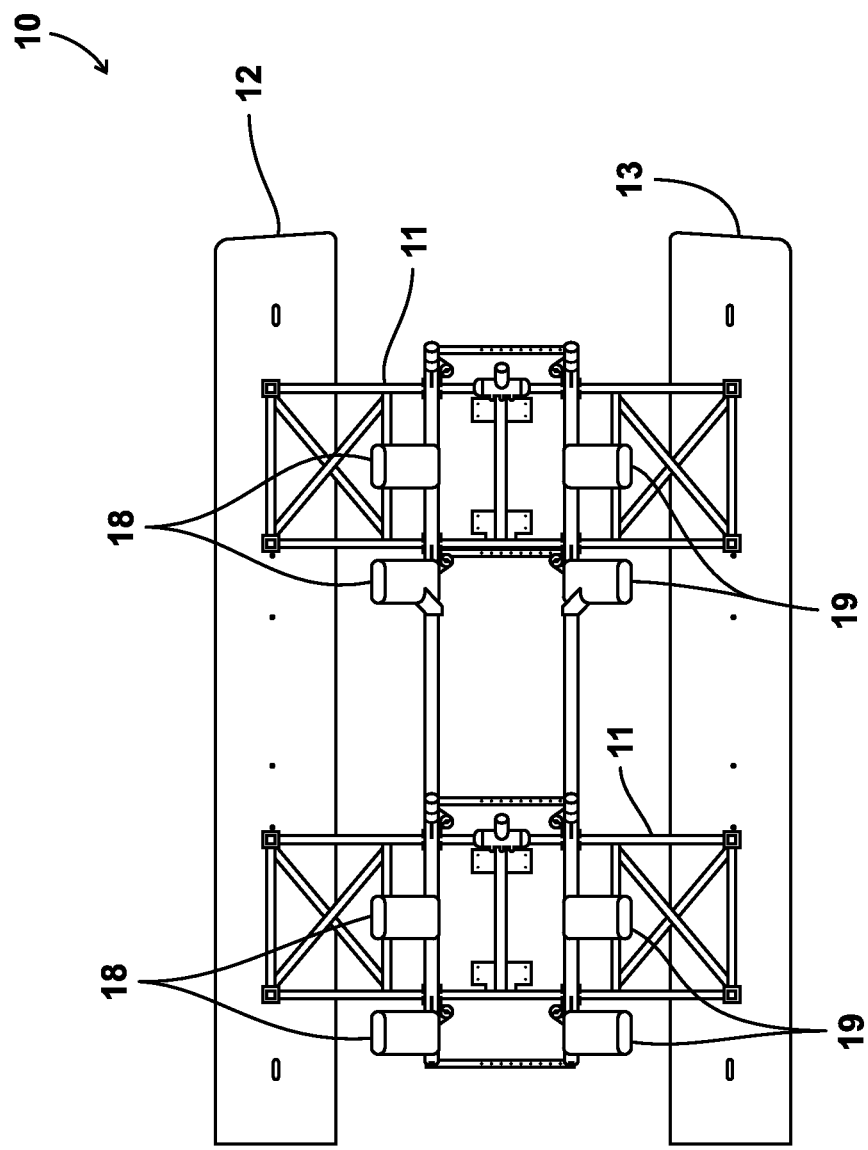
FIG. 5 is a plan view of a preferred embodiment of the apparatus of the present invention.
Figure 6:
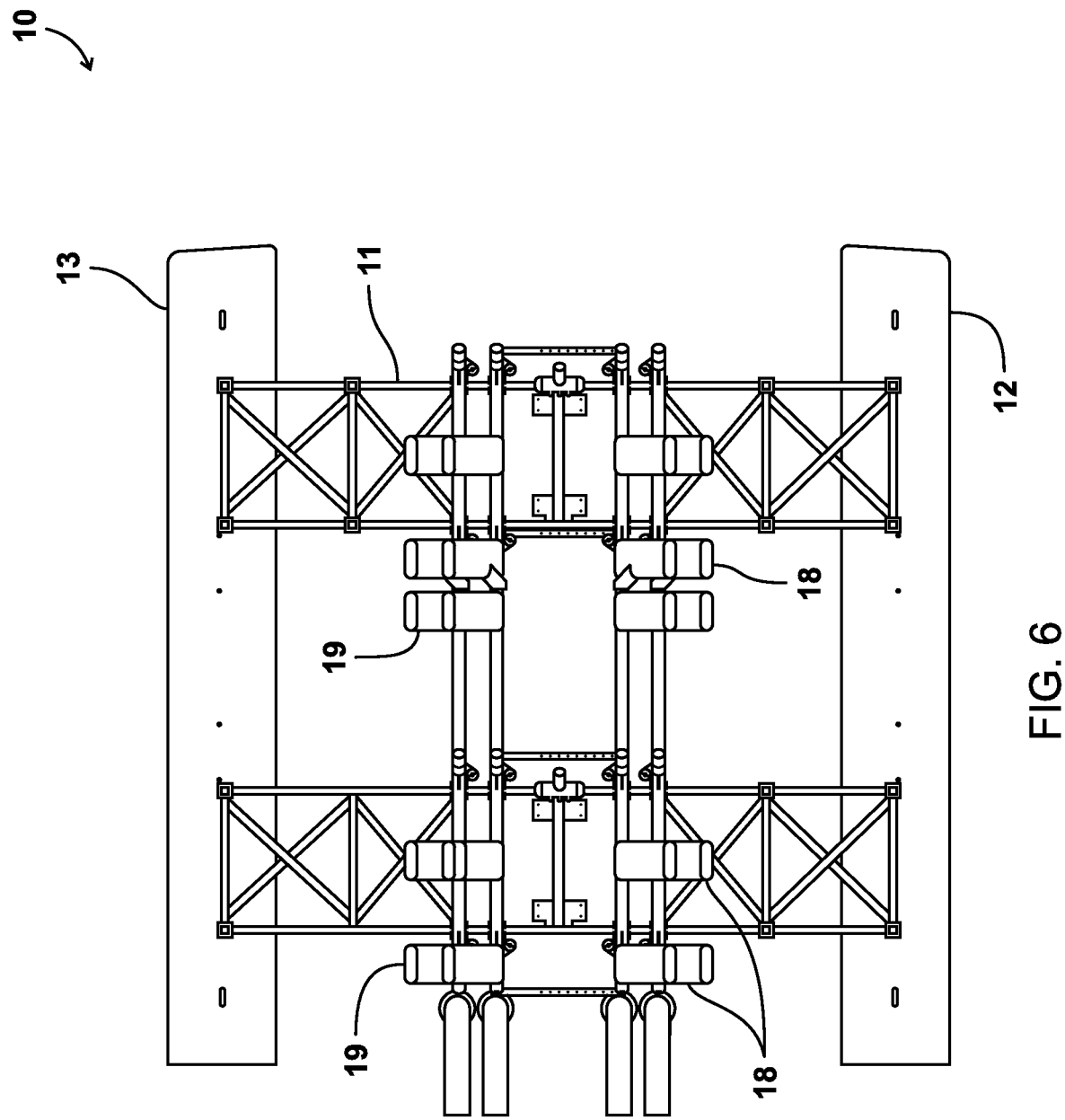
FIG. 6 is a plan view of a preferred embodiment of the apparatus of the present invention.
Figure 7:
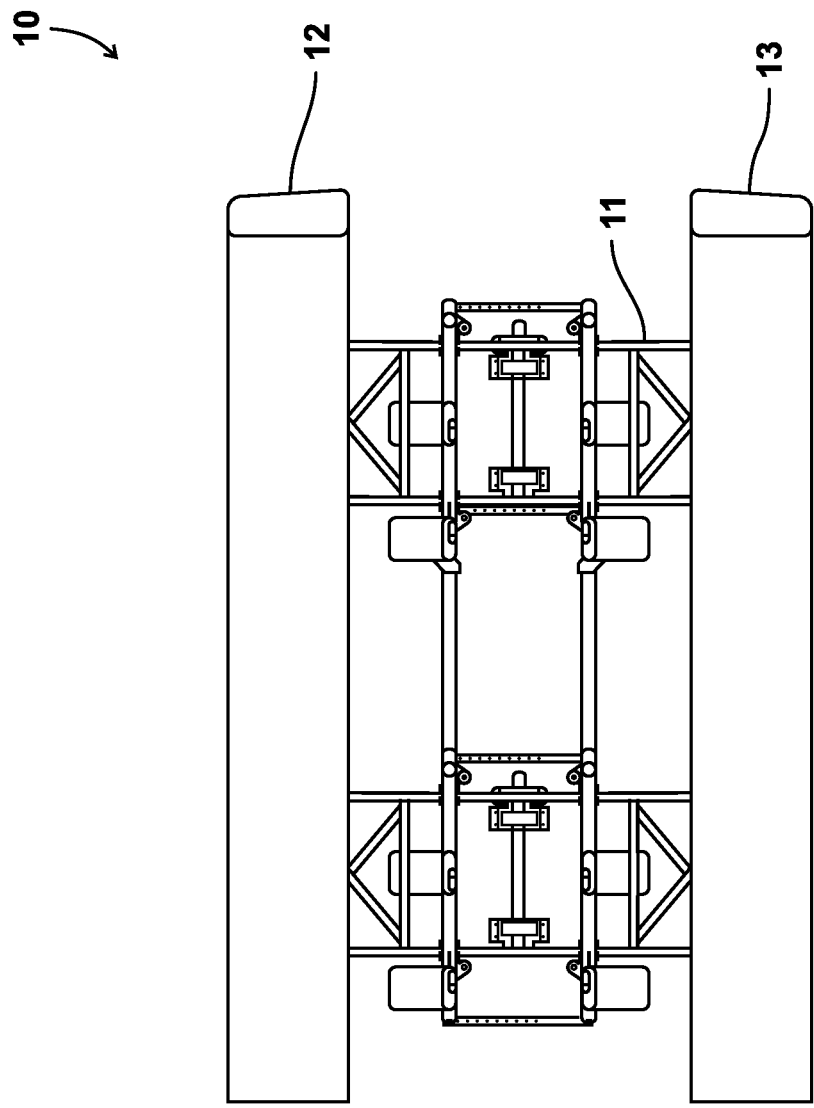
FIG. 7 is a bottom view of a preferred embodiment of the apparatus of the present invention.
Figure 8:
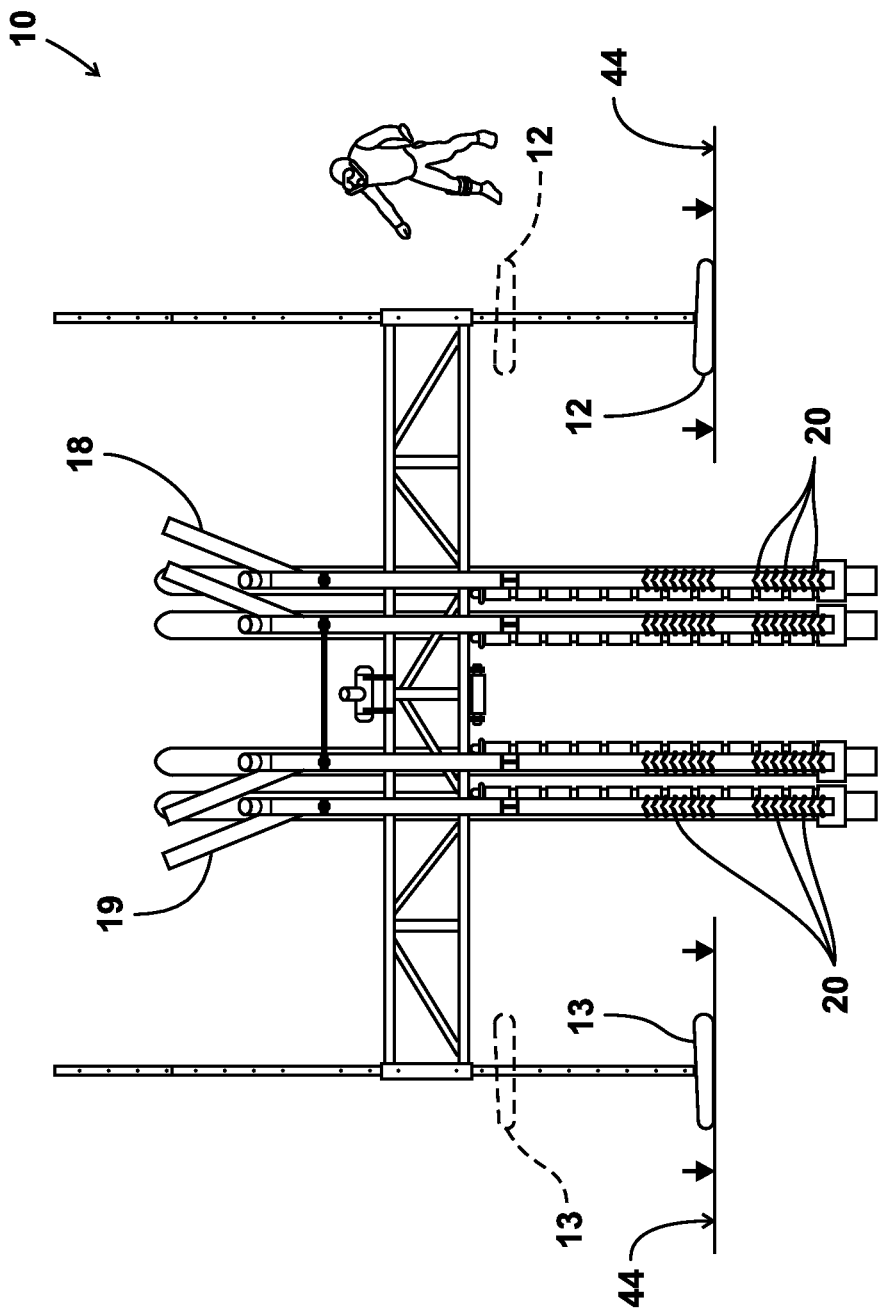
FIG. 8 is a front elevation view of a preferred embodiment of the apparatus of the present invention.
Figure 11:
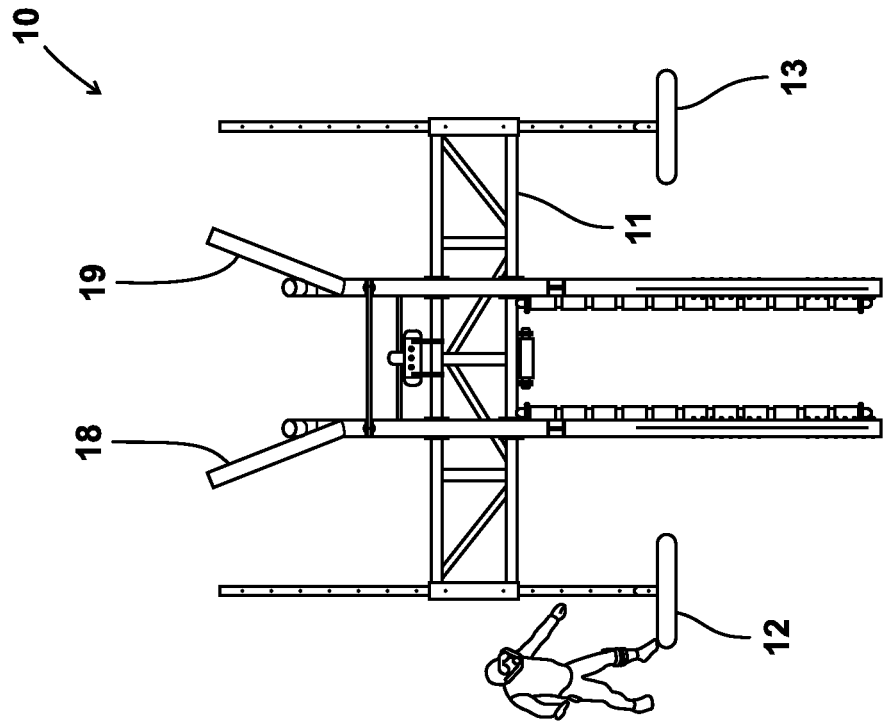
FIG. 11 is a rear view of a preferred embodiment of the apparatus of the present invention.
Figure 10:
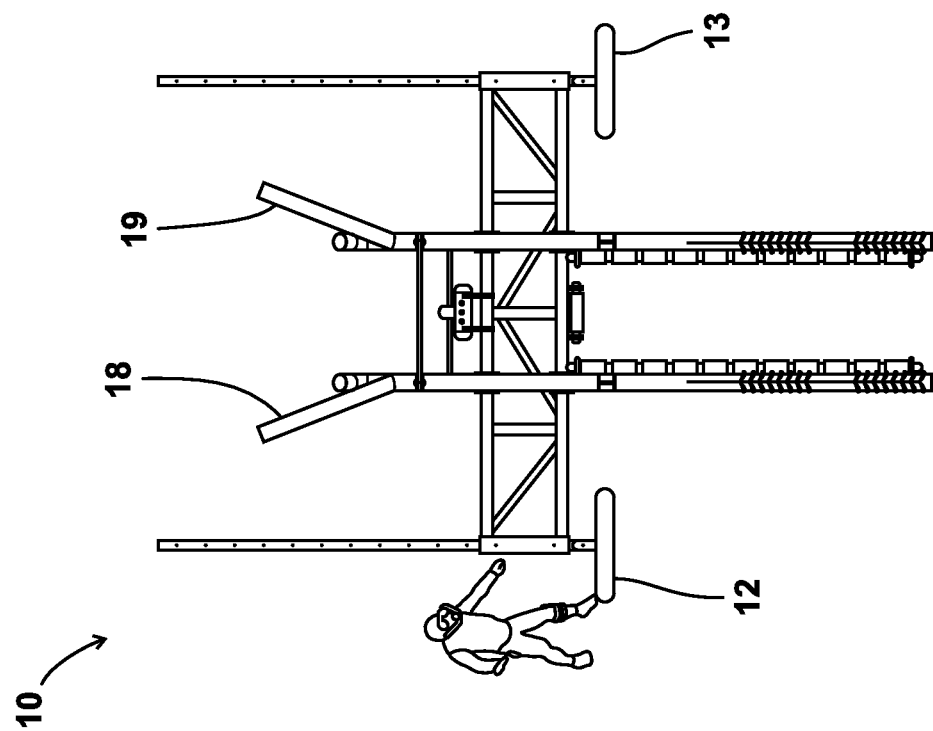
FIG. 10 is a rear view of a preferred embodiment of the apparatus of the present invention.

Each vertical or inclined pipe or pipe section 14, 15, 16, 17 can be fitted with multiple or several spaced apart jetting nozzles 20 (see FIGS. 1-2, 12). Jetting nozzles 20 can be vertically spaced apart and laterally spaced apart. The jetting nozzles 20 can point in different directions such as forward, sideways, angled up, or angled down to provide jetting in as many directions as possible and thus maximize digging and mechanical breakup of the seabed 44 when forming a trench or ditch 41 to hold pipe or pipeline 40. As an example, a single one of the pipes or pipe section could have 25-250 or more nozzles 20.

In one embodiment of the present invention, each pipe section 14, 15, 16 and 17 can be preferably about 10-40 feet (3.05 to 12.19 meters) in height and more preferably, about 15-30 feet (14.57 to 9.14 meters) in height. In various embodiments, the pipe sections 14, 15, 16, 17 have different lengths. In various embodiments the pipe sections 14, 15 have different lengths from pipe sections 16, 17. In one embodiment of the present invention, each pipe section 14, 15, 16 and 17 can be preferably about 3-10 inches (7.62 to 25.4 centimeters) in diameter, more preferably about 4-8 inches (10.16 to 20.32 centimeters) in diameter, and most preferably about 6 inches (15.24 centimeters) in diameter.

As the frame 11 or sled moves forward, such as being pulled by a barge or a vessel or a winch on a barge or vessel, the trench or ditch 41 is formed by the cutting jetting nozzles 20. Seabed sediment or seabed material is mechanically broken up and fluidized or slurried, or becomes an emulsification and thereby is removed to prevent its settling back into the trench or ditch 41. Air lifts 18, 19 are provided to remove this mechanically broken up or slurried seabed material and transport it laterally away from the ditch or trench 41 (see FIGS. 1, 13).

In one embodiment of the present invention, air lifts 18, 19 can be made out of steel, stainless steel, aluminum or PVC. In one embodiment of the present invention, each air lift 18, 19 can preferably be about 10-40 feet (3.048 to 12.192 meters) in height and more preferably, about 15-30 feet (4.572 to 9.144 meters) in height. In various embodiments, the air lifts 18 and 19 have different lengths. In various embodiments, the air lifts 18, 19 have lengths that are not equal. In one embodiment of the present invention, each air lift 18, 19 can preferably be about 12-36 inches (30.48-91.44 centimeters) wide, more preferably about 18-30 inches (45.72-76.2 centimeters) wide, and most preferably about 24 inches (60.96 centimeters) wide.

Each vertical or inclined pipe section 14, 15, 16, 17 preferably has multiple internally threaded openings 42 thus providing a place for attachment of the jetting nozzles 20. Each jetting nozzle can have nozzle body 23 with external threads or externally threaded portion 22 (see FIGS. 16-17). Nozzle body 23 can have outer end portion 45 and inner end portion 46. External threads or externally threaded portion 22 preferably extends between inner end portion 46 and channels 30, 31, 32, 33. Each jetting nozzle 20 preferably is installed on or attaches to a vertical or inclined pipe section 14, 15, 16, 17 by engaging external threads 22 of nozzle body 23 with an internally threaded opening 42 on a selected pipe section 14, 15, 16, 17. Hexagonal portion 24 on nozzle body 23 enables a tool (e.g., wrench) to connect with and rotate nozzle body 23 during such installation.

During use, large pumps are used to transmit pressurized water flow to the bore or interior of each vertical or inclined pipe section 14, 15, 16, 17 and to the jetting nozzles 20. In one embodiment of the present invention, one or more large pumps, such as a Union, 4 Stage or 9 Stage, or Patterson, 10×10, can be used. As an example, this pressure can be between about three hundred and three thousand (300-3,000) p.s.i. (2068-20,684 kpa).

As seen in FIGS. 14-20, jetting nozzle 20 can have a nozzle body 23 with a central longitudinal channel 25 having conically shaped or conical sections 26, 27. The conical sections 26, 27 can have a maximum internal diameter that can be greater than the internal diameter 39 of cylindrical section 28 of central longitudinal channel 25. An insert, such as insert 35, can be included for "wear" resistance, and can typically be made out of tungsten or ceramic. Insert 35 can have a cylindrically shaped channel 37 and a conically shaped channel 36 (see FIG. 17). Insert 35 can be held in place with an interference fit, threaded connection, or weld, for example.

Conically shaped channel 36 can have a maximum internal diameter that can be greater than the internal diameter of the cylindrically shaped channel 37. In one embodiment of the present invention, conical sections 26, 27 have an internal diameter of preferably about 0.3-1.2 inches (0.762-3.048 centimeters), more preferably about 0.5-1 inches (1.27-2.54 centimeters), and most preferably about 0.788 inches (2.00 centimeters) in diameter. Central longitudinal channel 25 has a discharge section 29 with a maximum internal diameter 38 that is larger than the internal diameter of cylindrical section 28. Cylindrical section 28 is in between conically shaped sections 26, 27 and discharge section 29. During use, channel 25 receives fluid flow from the bore or interior of a vertical or inclined pipe or pipe section 14, 15, 16 or 17. Fluid in channel 25 discharges via discharge section 29 to the surrounding lake, ocean or sea where pressure is hydrostatic and based upon the water depth. The pressure of the fluid stream in channel 25 cylindrical section 28 is much higher than the outside surrounding hydrostatic pressure.

In one embodiment of the present invention, jetting nozzle 20 can have a nozzle body 23 with a diameter of preferably about 0.750-3.00 inches (1.905 to 7.62 centimeters), more preferably about 1.00-2.50 inches (2.54 to 6.35 centimeters), and most preferably about 1.315 inches (3.340 centimeters). In one embodiment of the present invention, internal diameter 39 of cylindrical section 28 is preferably about 0.0625-0.500 inches (0.1589-1.27 centimeters), more preferably about 0.125-0.375 inches (0.318-0.9523 centimeters), and most preferably about 0.250 inches (0.635 centimeters). Jet nozzle 20 can have a body length of preferably 1.00-5.00 inches (2.54-12.7 centimeters). More preferably about 1.50-4.00 inches (3.81-10.16 centimeters), and most preferably 2.905 inches (7.379 centimeters).

Figure 15:
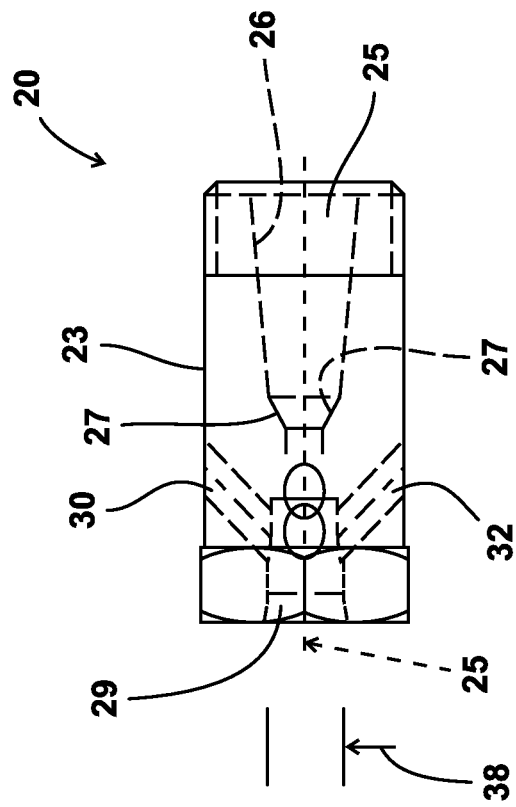
FIG. 15 is a fragmentary side view of a preferred embodiment of the apparatus showing the jetting nozzle.
Figure 14:
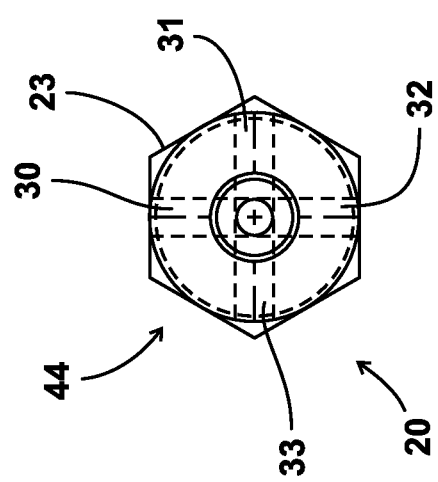
FIG. 14 is an fragmentary end view of a preferred embodiment of the apparatus showing the jetting nozzle.
Figure 17:
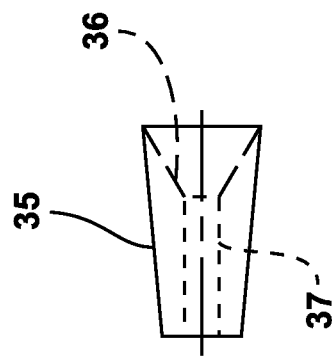
FIG. 17 is a fragmentary view of a preferred embodiment of the apparatus showing the jetting nozzle.
Figure 16:
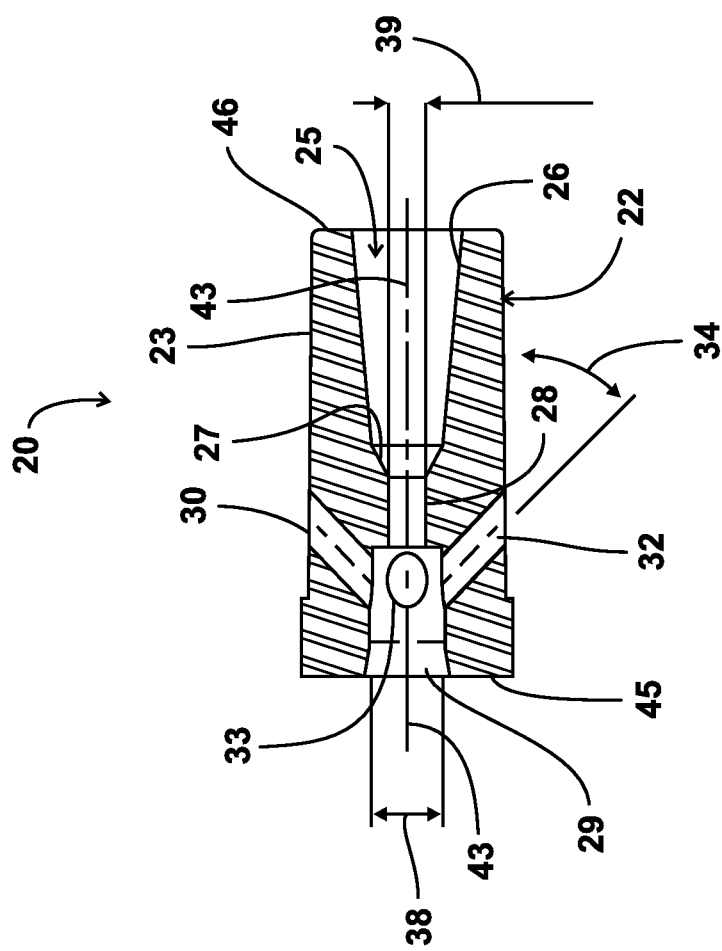
FIG. 16 is a fragmentary view of a preferred embodiment of the apparatus showing the jetting nozzle.
Figure 18:
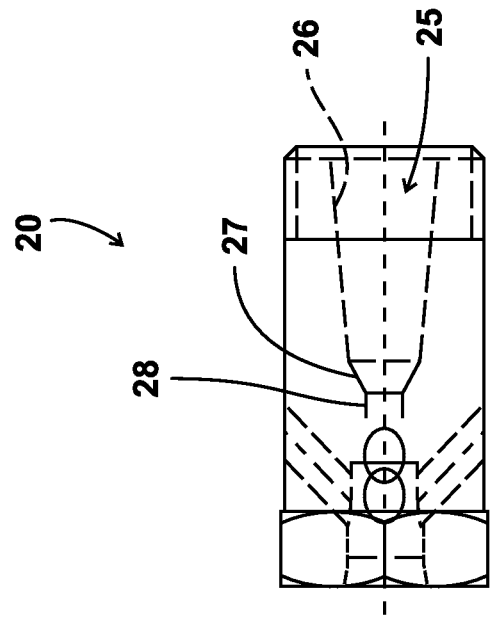
FIG. 18 is a fragmentary view of a preferred embodiment of the apparatus showing the jetting nozzle.
Figure 19:
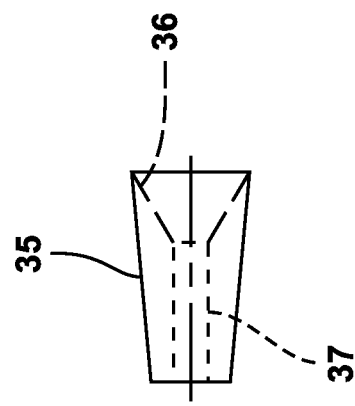
FIG. 19 is a fragmentary view of a preferred embodiment of the apparatus showing the jetting nozzle.
Figure 20:
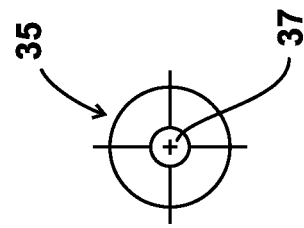
FIG. 20 is a fragmentary view of a preferred embodiment of the apparatus showing the jetting nozzle.

Downstream of cylindrical section 28, water flows via a plurality of lateral channels 30, 31, 32, 33 from the outer surface of nozzle body 23 to discharge section 29 because of venturi effect (see FIGS. 14-15). The result is a higher volume but lower pressure discharge from nozzle 20 discharge section 29. Nozzle 20 thus performs some cutting, but high volume of water flow helps fluidize cut material and remove it from its original location. Angle 34 is the angle formed by a said lateral channel 30, 31, 32, 33 and the central longitudinal axis 43 of central longitudinal channel 25. Thus, angle 34 can be between about ten and eighty degrees, more preferably about twenty and seventy degrees, even more preferably between about forty and sixty degrees.

The following is a list of parts and materials suitable for use in the present invention:

PARTS LIST

| PART NUMBER | DESCRIPTION |
| --- | --- |
| 10 | pipe burying apparatus |
| 11 | frame/sled |
| 12 | pontoon/skid |
| 13 | pontoon/skid |
| 14 | front vertical or inclined pipe |
| 15 | front vertical or inclined pipe |
| 16 | rear vertical or inclined pipe |
| 17 | rear vertical or inclined pipe |
| 18 | port airlift |
| 19 | starboard airlift |
| 20 | jetting nozzle/nozzle |
| 21 | arrow |
| 22 | external threads/externally threaded portion |
| 23 | nozzle body |
| 24 | hexagonal portion |

-continued

| PART NUMBER | DESCRIPTION |
| --- | --- |
| 25 | central longitudinal channel |
| 26 | conically shaped section |
| 27 | conically shaped section |
| 28 | cylindrical section |
| 29 | discharge section |
| 30 | lateral channel |
| 31 | lateral channel |
| 32 | lateral channel |
| 33 | lateral channel |
| 34 | angle |
| 35 | insert |
| 36 | conically shaped channel |
| 37 | cylindrically shaped channel |
| 38 | internal diameter |
| 39 | internal diameter |
| 40 | pipeline |
| 41 | ditch/trench |
| 42 | internally threaded opening |
| 43 | central longitudinal axis |
| 44 | sea bed |
| 45 | outer end portion |
| 46 | inner end portion |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An underwater pipeline burying apparatus, comprising:
 (a) a frame;
 (b) spaced apart inclined pipe sections of the frame that are configured to be placed on opposing sides of the pipeline to be buried;
 (c) each said inclined pipe section having an internal bore and fitted with a plurality of jetting nozzles that are positioned on a said pipe section in spaced apart positions;
 (d) at least some of said plurality of jetting nozzles including:
  a nozzle body having an outer surface and a main, central longitudinal channel with a central channel axis and a diameter;
  a fluid inlet end portion of said body having an externally threaded portion;
  a discharge end portion of said body extending outwardly from a said inclined pipe section and said threaded portion;
  a plurality of lateral channels that intersect said main channel at an acute angle;
  wherein the diameter of the central longitudinal channel does not reduce downstream of said lateral channels; and
 (e) a source of pressurized fluid that includes air; and
 (f) one or more conduits that transmit said pressurized fluid to said inclined pipe section internal bore.

2. The pipeline burying apparatus of claim 1 wherein said main central longitudinal channel having an inlet section with an inlet section diameter, a discharge section having an outlet section diameter and a connecting section that is in between the inlet section and the discharge section.

3. The pipeline burying apparatus of claim 2 wherein the connecting section is generally cylindrically shaped.

4. The pipeline burying apparatus of claim 2 wherein the connecting section has a diameter that is smaller than the diameter of the discharge section.

5. The pipeline burying apparatus of claim 2 wherein at least one said lateral channel intersects with said discharge section.

6. The pipeline burying apparatus of claim 2 wherein multiple said lateral channels intersect with said discharge section.

7. The pipeline burying apparatus of claim 2 wherein each lateral channel has a lateral channel inlet and a lateral channel outlet that is in fluid communication with said discharge section, and wherein the lateral channel outlet is closer than the lateral channel inlet to the discharge end portion.

8. The pipeline burying apparatus of claim 1 wherein there are at least three of said lateral channels.

9. The pipeline burying apparatus of claim 1 wherein there are at least four of said lateral channels.

10. The pipeline burying apparatus of claim 1 wherein at least a part of said central longitudinal axis is conically shaped.

11. The pipeline burying apparatus of claim 1 wherein at least a part of said central longitudinal axis is frustoconically shaped.

12. The pipeline burying apparatus of claim 1 wherein said angle is between about ten and eighty degrees.

13. The pipeline burying apparatus of claim 1 wherein said angle is between about twenty and seventy degrees.

14. The pipeline burying apparatus of claim 1 wherein said angle is between about thirty and sixty degrees.

15. The pipeline burying apparatus of claim 1 wherein said angle is between about forty and fifty degrees.

16. The pipeline burying apparatus of claim 1 wherein said angle is about forty-five degrees.

17. The pipeline burying apparatus of claim 1 wherein the fluid inlet includes a supply of pressurized air.

18. The pipeline burying apparatus of claim 17 wherein the pressurized air has a flow rate of between about 400 cubic feet per minute (c.p.m) (11 cubic meters per minute) and 10,000 cubic feet per minute (c.p.m.) (283 cubic meters per minute).

19. The pipeline burying apparatus of claim 17 wherein the pressurized air has a pressure of between about 100 and 300 p.s.i. (689 and 2,068 kpa).

20. The pipeline burying apparatus of claim 1 wherein the fluid inlet connects to a source of fluid of between 400 c.f.m. (11 cubic meters per minute) at 100 p.s.i. (689 kpa) and 10,000 c.f.m. (283 cubic meters per minute) at 300 p.s.i. (2,068 kpa).

21. A method of burying an underwater pipeline, comprising the steps of:
 (a) providing a frame that is adapted to travel along the pipeline to be buried, the frame having one or more inclined pipe members, each said inclined pipe member fitted with multiple jetting nozzles, each jetting nozzle having an outer surface and a nozzle flow channel having an inlet that communicates with an interior of the one or more inclined pipe members and an outlet that discharges pressurized fluid externally of an inclined pipe member to cut soil or sediment at a seabed;
 (b) pumping fluid under pressure to the flow channel of the jetting nozzles via the inclined pipe members; and
 (c) mixing sea water that is at a hydrostatic pressure based upon water depth at the jetting nozzles with the fluid under pressure of step "b" by intaking the sea water via one or more lateral flow lines that each communicate with the nozzle outer surface and the nozzle flow channel.

22. The method of claim 21 wherein the pressure in step "b" is between about three hundred p.s.i (2,068 kpa) and three thousand p.s.i. (20,684 kpa).

23. The method of claim 21 wherein the flow channel has an inlet section with an inlet section diameter, a discharge section with a discharge section diameter and a connecting channel section in between the inlet section and discharge section.

24. The method of claim 23 wherein the connecting channel has a diameter that is smaller than the discharge section diameter.

25. The pipeline burying apparatus of claim 1 wherein the apparatus is powered by 100 to 20,000 total horsepower (74.57 to 14,913 kilowatts).

26. The method of claim 21 wherein in step "b" the fluid includes air.

27. The method of claim 26 wherein the air flows at between 400 and 10,000 cubic feet per minute (c.f.m.) (11 to 283 cubic meters per minute).

28. The apparatus of claim 1 wherein the frame weighs between 5 tons (4.5 metric tons) and 250 tons (227 metric tons).

29. The method of claim 21 wherein the frame operates at a seabed soil pressure of between about 200 pounds per square foot (9.58 kilopascals) and 6,265 pounds per square foot (299.97 kilopascals).

30. The method of claim 21 wherein the soil or sediment density is between about 68 pounds per cubic foot (1,089 kilograms per cubic meter) and 187 pounds per cubic foot (2,995 kilograms per cubic meter).

31. The method of claim 21 wherein the pipeline is between about 2 inches (5.08 centimeters) and 84 inches (213 centimeters) in diameter.

32. The method of claim 31 wherein the pipeline is rigid steel, flexible steel, an umbilical, HDPE, or a cable.

33. A method of burying an underwater pipeline below a water bottom and into a seabed, comprising the steps of:
 (a) providing a frame that is adapted to travel underwater along the pipeline to be buried, the frame having one or more inclined pipe members, each said inclined pipe member fitted with multiple jetting nozzles, each jetting nozzle having an outer surface and a nozzle flow channel, said flow channel having a nozzle inlet that communicates with an interior of the one or more inclined pipe member and a nozzle outlet that discharges pressurized fluid externally of the one or more inclined pipe member to cut soil material or sediment material at a seabed;
 (b) submerging the frame in a body of water above said seabed;
 (c) pumping fluid under pressure to the flow channel of the jetting nozzles via the inclined pipe members; and
 (d) intaking an influent water from the body of water that surrounds said frame at each said nozzle via one or more lateral flow lines, wherein each lateral flow line extends between said flow channel and said nozzle outer surface at a nozzle intake located externally of a said inclined pipe member;
 (e) in a said nozzle flow channel, mixing sea water with the fluid under pressure of step (b); and
 (f) discharging the mixture of water from the body of water and fluid under pressure of step "d" into a surrounding seabed that is to be cut, wherein the combined discharge of jetting fluid and water from the body of water helps fluidize cut material.

34. The pipeline burying apparatus of claim 33 wherein each lateral flow line has a lateral flow line inlet and a lateral flow line outlet that is in fluid communication with said nozzle outlet, and wherein the lateral flow line outlet is closer than the lateral flow line inlet to the nozzle outlet.

35. The pipeline burying apparatus of claim 33 wherein the nozzle inlet includes a supply of pressurized air.

36. The pipeline burying apparatus of claim 35 wherein the pressurized air has a flow rate of between about 400 cubic feet per minute (c.p.m) (11 cubic meters per minute) and 10,000 cubic feet per minute (c.p.m.) (283 cubic meters per minute).

37. The pipeline burying apparatus of claim 35 wherein the pressurized air has a pressure of between about 100 and 300 p.s.i. (689 and 2,068 kpa).

38. The pipeline burying apparatus of claim 33 wherein the nozzle inlet connects to a source of fluid of between 400 c.f.m. (11 cubic meters per minute) at 100 p.s.i. (689 kpa) and 10,000 c.f.m. (283 cubic meters per minute) at 300 p.s.i. (2,068 kpa).

39. The method of claim 33 wherein the pressure in step "b" is between about three hundred p.s.i (2,068 kpa) and three thousand p.s.i. (20,684 kpa).

40. The method of claim 33 wherein the flow channel has an inlet section with an inlet section diameter, a discharge section with a discharge section diameter and a connecting channel section in between the inlet section and discharge section.

41. The pipeline burying apparatus of claim 40 wherein each lateral channel has a lateral channel inlet and a lateral channel outlet that is in fluid communication with said discharge section, and wherein the lateral channel outlet is closer than the lateral channel inlet to the discharge end portion.

42. The method of claim 33 wherein the nozzle flow channel has a conically shaped section next to the nozzle inlet.

\* \* \* \* \*